United States Patent [19]
Kratel et al.

[11] 3,953,487
[45] Apr. 27, 1976

[54] PROCESS FOR PREPARING HYDROPHOBIC SILICON DIOXIDE

[75] Inventors: Günther Kratel, Durach-Bochen; Günter Stohr, Kempten; Georg Vogt, Kempten, St. Mang; Hans Kaiser, Lauben, Allgau, all of Germany

[73] Assignee: Elektroschmelzwerk Kempten GmbH, Munich, Germany

[22] Filed: Aug. 23, 1974

[21] Appl. No.: 500,203

[30] Foreign Application Priority Data
Sept. 3, 1973  Germany................ 2344388

[52] U.S. Cl.............. 260/448.2 E; 260/448.8 AS
[51] Int. Cl.². .................. C07F 7/04; C07F 7/08; C07F 7/10; C07F 7/18
[58] Field of Search............ 260/448.8 AS, 448.2 E

[56] References Cited
UNITED STATES PATENTS
2,802,850   8/1957   Wetzel ................ 260/448.8 AS X

*Primary Examiner*—Paul F. Shaver
*Attorney, Agent, or Firm*—Allison C. Collard

[57] ABSTRACT

Process for preparing hydrophobic $SiO_2$ by reacting solid $SiO_2$ of finest particle size with organosilicon compounds while subjecting the reaction mixture to a mechanical impact treatment which will at the same time result in a comminution of the $SiO_2$ particles as well as of their aggregates, said process comprising incorporation to the reaction mixture, in addition to the water adsorbed by the $SiO_2$, an amount of 0.3 to 3% by weight of water calculated on the weight of the $SiO_2$.

5 Claims, No Drawings

PROCESS FOR PREPARING HYDROPHOBIC SILICON DIOXIDE

The present invention relates to an improved process for the preparation of hydrophobic $SiO_2$. In the process, organosilicon compounds are reacted with solid $SiO_2$ of finest particle size, which particles, or aggregates of particles, are subjected in the reaction mixture to a mechanical impact treatment causing a comminution of the particles. The improvement is primarily obtained by the simultaneous use of water.

It is already known, for instance in the preparation of so-called "grinding aids", to subject to a hydrophobing action, solid $SiO_2$ of finest particle size together with organosilicon compounds by treatment in a ball mill. (See e.g. DTAs 1507 503.) It is assumed that while comminution takes place the particles of $SiO_2$ are at the same time reacting with the organosilicon compounds. When, according to the present invention, water is simultaneously used, the above mentioned actions are accelerated and the so obtained hydrophobic $SiO_2$ is of a higher usefulness for many purposes than the hitherto obtained hydrophobic $SiO_2$ reacted with silicon compounds under mechanical impact.

The present invention therefore consists in a process for making hydrophobic $SiO_2$ by reacting organosilicon compounds with solid silica of finest particle size while subjecting the reaction mixture to mechanical impact treatment which causes comminution, and the improvement thereof consists in simultaneously adding during the treatment 0.3 to 3% by weight of water in addition to the water which may already be contained by absorption in the $SiO_2$, the added water being calculated on the weight of the $SiO_2$. Should an increase in bulk weight have occured during the comminution of the $SiO_2$, a decrease of the bulk weight should be effected by mechanical impact treatment.

The organosilicon compounds to be reacted with the solid $SiO_2$ of finest particle size may be the same which have been used up to now for making hydrophobic $SiO_2$.

The preferred organosilicon compounds to be used have the formula

$(R_3Si)_aZ$ wherein R represents the same or different, monovalent, sometimes subtituted hydrocarbon radicals, Z stands for halogen, hydrogen or a radical of the formula —OH, —OR', —NR'X, —ONR'$_2$, —SR', —OOCR', —O—, —N(X)— Or —S—, R' representing mostly an alkyl radical with 1 to 4 carbon atoms, and X is hydrogen or has the same meaning as R', and $a$ is 1 or 2.

The most important example for the hydrocarbon radical R is methyl. Other examples are octadecyl, phenyl, or vinyl.

Examples for substituted hyrocarbon radicals R are particularly halogenated hydrocarbon radicals, e.g. 3,3,3-trifluoropropyl. Examples for R' are the methyl, ethyl, and propyl radicals. Examples for organosilicon compounds of the above indicated formula are the following: Hexamethyldisilazane, trimethylsilane, trimethylchlorosilane, trimethylethoxysilane, triorganosilylmercaptanes, such as, trimethylsilylmercaptane, triorganosilyloxyacylate, e.g., vinyldimethylacetoxysilane, triorganosilylamines, e.g. trimethylsilylisopropylamine, trimethylsilylethylamine, dimethylphenylsilylpropylamine and vinyldimethylsilylbutylamine; triorganosilylaminoxy compounds, e.g., diethylaminoxytrimethylsilane and diethylaminoxydimethylphenylsilane, also hexamethyldisiloxane, 1,3-divinyltetramethyldisiloxane, 1,3-diphenyltetramethyldisiloxane and 1,3-diphenyltetramethyldilazane.

Other examples for organosilicon compounds reacted with the fine particle size $SiO_2$ according to the invention are dimethyldichlorosilane, dimethyldiethoxysilane, dimethyldimethoxysilane, diphenyldiethoxysilane, vinylmethyldimethoxysilane, vinyltriethoxysilane and octamethylcyclotetrasiloxane and/or dimethylpolysiloxanes with 2 to 12 siloxane units per molecule, said dimethylpolysiloxanes containing in each of the terminal units a hydroxyl group linked to Si.

Mixtures of various organosilicon compounds may be reacted with the finest particle size $SiO_2$.

Trimethylethoxysilane is a preferred reactant to be used for reaction with the solid, finest particle size $SiO_2$, since that organosilicon compound is comparatively easy to obtain and gives excellent results.

The organosilicon compounds reacted with the $SiO_2$ of finest particle size are used in amounts of 3 to 25% by weight, especially 4 to 16% by weight, each calculated on the weight of the $SiO_2$ to be reacted.

The expression "solid" in connection with the $SiO_2$ to be used according to the invention is supposed to indicate that $SiO_2$ is not used as a sol, but in air dry state, apart from some absorbed water, before it is contacted with water, according to the invention.

The fine-particle size $SiO_2$ to be reacted with the organosilicon compounds has, preferably a surface of 50 $m^2/g$ to 600 $m^2/g$ measured by nitrogen adsorption according to the method described in ASMT special technical bulletin No. 51, 1941, page 95 and following, mostly designated BET method. Because of its purity and especially fine particle size, the $SiO_2$ used according to the invention is mostly obtained by pyrogenic methods, and is called in American and British papers "Fume Silica"; one such $SiO_2$ preferably used is prepared by hydrolysis of silicon tetrachloride at temperatures above 800°C. Other examples of $SiO_2$ having a surface (of at from at least 50 $m^2/g$ to 600 $m^2/g$ are dehydrated silica gels, whose structure is unchanged; also xerogels and precipitated $SiO_2$ with a surface of at least 50 $m^2/g$. Mixtures of different kinds of $SiO_2$ may be used.

$SiO_2$ of finest particle size is mostly present in the form of aggregates. These aggregates are composed of interlaced chains which consist in turn of the so-called "primary particles" of $SiO_2$. It is primarily the aggregates which undergo comminution during the mechanical impact treatment used with the present invention.

The water used according to the invention as an additive in the process, may be present as liquid or as steam. Less than 0.3% by weight of water calculated on the $SiO_2$, result in an insufficient acceleration of the reaction with the organosilicon compounds. More than 3% by weight of water, calculated on $SiO_2$, result in the presence of an undesirable amount of volatile component in the product. The water may be contacted with the $SiO_2$ before or simultaneously with the addition of the organosilicon compound.

In addition to water, known condensation catalysts may be used, if desired, in order to promote the reaction of the $SiO_2$ with the organosilicon compounds. Examples of such condensation catalysts are HCl, amines, such as n-prim.-butylamine, and/or metal compounds, e.g. titanium tetrachloride, or dibutyltin dilaurate. The preferred compounds are HCl. The simultaneous use of condensation catalysts is by no means always necessary.

The mechanical impact exerted on the reaction mixture simultaneously with the reaction of the fine-particle size $SiO_2$ and the organosilicon compound whereby comminution of the $SiO_2$ and/or its aggregates occurs, is so effected or adjusted that by the impact, the bulk weight of the $SiO_2$ is increased to 120 to 500 g/l, especially to 150 – 320 g/l. Values of 320 g/l are particularly important in precipitated $SiO_2$ having a surface of more than 50 m$^2$/g. The bulk weight (DIN/Deutsche Industrie Norm 53 468) of pyrogenically obtained $SiO_2$ is generally 20 to 85 g/l without treatment to increase the bulk weight. Thus, the reaction of the fine-particle size $SiO_2$ with an organosilicon compound is preferably brought about in the presence of inert moving bodies exerting mechanical pressure on the $SiO_2$. Suitable devices are e.g. edge or pug mills, mills having grinding bodies, such as ball mills, for example, ball mills with stirrers, tube mills, cone mills, oscillating mills or roller mills, mills with friction rollers or rollers themselves. Ball mills and roller mills are preferred.

When less effective mixing devices are used in the preparation of the hydrophobic $SiO_2$ made according to the invention, or if it is desired to bring about rapid and even dispersion of the hydrophobic $SiO_2$ in other media, it may be advantageous to reduce the bulk weight once more to a certain extent by mechanical impact before putting the $SiO_2$ reacted with organosilicon compounds to further use in the case that upon comminution of the $SiO_2$ an increase of the bulk weight has taken place.

If desired, the mechanical impact effected during the reaction of the fine-particle size $SiO_2$ with organosilicon compound resulting in the comminution of the $SiO_2$ or its aggregates may be carried out in other mills than ball mills so that the bulk weight of the $SiO_2$ will not substantially be changed. Such mills are for example pin mills, air mills, jet mills, or impact mills.

Finally, the mechanical impact effected during the reaction of the fine-particle-size $SiO_2$ with organosilicon compounds and its concurrent comminution may also be brought about by carrying out the reaction in an inert organic solvent with a high-speed homogenizing or dispersing device having for example 2000 rpm.

Mills with grinding bodies are generally not equipped with heating means or pressure regulating means, namely, pressure differing from atmospheric. The reaction of the $SiO_2$ with the organosilicon compound is therefore mostly carried out at room temperature and the pressure of the ambient atmosphere is thus at or about 760 mm Hg. However, if possible and desirable, other temperatures in the range of 15° to 150°C, and other pressures may be applied.

The duration of the reaction of the $SiO_2$ and organosilicon compound may be from about 30 minutes to 15 hours.

The process according to the invention can be carried out continuously or discontinuously.

The hydrophobic $SiO_2$ made according to the invention is very well suited as filler of masses which upon hardening will yield elastomers based on diorganopolysiloxanes comprising filling agents. The masses may have the property of hardening at elevated temperatures, mostly above 100°C, yielding elastomers e.g. by the aid of peroxidic compounds; they also may be socalled "two-component systems" or a "one-component system" which hardens to elastomers at room temperature; or, finally, they may be among those which contain Si-linked hydrogen and aliphatic multiple valences or catalysts promoting the addition of Si-linked hydrogen to aliphatic multiple valences, such as platinum compounds and are capable of hardening to elastomers at room temperature or temperatures slightly higher, mostly 50° – 80°C. The hydrophobic $SiO_2$ made according to the invention is likewise very suitable for other hardenable masses than the one mentioned above, for instance masses storable in the absence of water consisting of polyurethaneprepolymers, polysulfide prepolymers, or masses based on natural or synthetic rubber, which are not built up from diorganopolysiloxanes.

They are also useful as fillers of thermoplastics, such as polymers and copolymers of vinyl chloride, vinyl acetate, styrene and/or ethylene. The hydrophobic $SiO_2$ according to the invention is also excellently suited for all other uses of hydrophobic $SiO_2$, e.g. as addition for enhancing the pouring properties of powder substances and as thickness of liquids.

EXAMPLE I 200 grams of $SiO_2$ pyrogenically obtained in the gaseous phase having a BET-surface of 200 m$^2$/g and a bulk weight of 65 g/l (obtainable from the firm Elektroschmelzwerk Kempten, Germany, under the designation "HDK") are mixed with 15 g trimethylethoxysilane and 2 g water and placed into a ball mill of porcelain having a capacity of 5 liters, of which 1.5 liters are filled with procelain balls having a diameter of 15 – 40 mm. After having replaced the air in the mill by HCl, the mill is operated for 2 hours at room temperature at 70 rpm. Thereafter, the contents of the mill are heated to 250°C for 2 hours in order to expel volatile components from the product, among others, trimethylethoxysilane.

What is claimed is:

1. A process for preparing hydrophobic $SiO_2$ which comprises the steps of:
   a. reacting solid $SiO_2$ of finest particle size with an organosilicon compound having the general formula

$(R_3Si)_nZ$ wherein R represents the same or different monovalent hydrocarbon radicals, Z represents a member of the group consisting of halogen, hydrogen and a radical of the formula —OH, —OR′, —NR′X, —ONR′$_2$, —SR′, —OOCR′, —O—, —N(X)—, and —S—, wherein R′ is alkyl with 1 to 4 carbon atoms, X is hydrogen or the same radicals as R, and $a$ is an integer from 1 to 2, while subjecting the reaction mixture to a mechanical impact treatment which will at the same time result in a comminution of the $SiO_2$ particles as well as of aggregates of the same, whereby the $SiO_2$ contains organosilicon groups bonded to it after the reaction;
   b. while incorporating into the reaction mixture, in addition to the water adsorbed to the $SiO_2$, an amount of from 0.3% to 3% by weight of water, calculated on the weight of the $SiO_2$.

2. The process according to claim 1, wherein in case of an increase in bulk weight having occurred during the comminution of the $SiO_2$ particles, mechanical impact is brought to bear on the $SiO_2$ reacted with the organosilicon compound for decreasing said bulk weight.

3. The process according to claim 1, wherein condensation catalysts are present during the impact treatment.

4. The process according to claim 3, wherein HCl is used as condensation catalyst.

5. The process according to claim 3, wherein amines are used as condensation catalysts.

* * * * *